(12) United States Patent
Evans et al.

(10) Patent No.: US 11,760,564 B2
(45) Date of Patent: Sep. 19, 2023

(54) APPARATUS, SYSTEM AND METHOD FOR SECURING WHEELED SHIPPING CARTS WITHIN A SHIPPING CONTAINER

(71) Applicant: Globe Composite Solutions, LLC, Stoughton, MA (US)

(72) Inventors: Brian Charles Evans, Marshfield, MA (US); David Shepard Farnsworth, Holliston, MA (US)

(73) Assignee: Globe Composite Solutions, LLC, Stoughton, MA (US)

( * ) Notice: Subject to any disclaimer, the term of this patent is extended or adjusted under 35 U.S.C. 154(b) by 0 days.

(21) Appl. No.: 18/085,758

(22) Filed: Dec. 21, 2022

(65) Prior Publication Data
US 2023/0124907 A1 Apr. 20, 2023

Related U.S. Application Data (62) Division of application No. 16/831,097, filed on Mar. 26, 2020, now Pat. No. 11,565,875.

(60) Provisional application No. 62/823,805, filed on Mar. 26, 2019.

(51) Int. Cl.
*B65D 90/00* (2006.01)
*B65D 88/12* (2006.01)
*B62B 3/00* (2006.01)

(52) U.S. Cl.
CPC ............ *B65D 90/006* (2013.01); *B62B 3/006* (2013.01); *B65D 88/121* (2013.01)

(58) Field of Classification Search
CPC ........... B65D 2519/00935; B65D 2519/00955; B65D 2519/00781; B65D 2501/24987; B65D 19/42; B65D 90/006; B65D 88/121; B65D 2590/0066; B65D 90/0053; B62B 3/006; B62B 5/0003
See application file for complete search history.

(56) References Cited

U.S. PATENT DOCUMENTS

| | | | | |
|---|---|---|---|---|
| 3,456,830 A | * | 7/1969 | Golder | B65D 90/008 220/668 |
| 3,580,602 A | * | 5/1971 | Hebert | B62B 3/006 211/189 |
| 4,146,139 A | * | 3/1979 | von Stein | B62B 3/006 211/126.9 |
| 5,265,748 A | * | 11/1993 | Furukawa | B65D 88/121 220/1.5 |
| 5,718,441 A | * | 2/1998 | Kern | B62B 3/16 211/187 |

(Continued)

*Primary Examiner* — Kareen K Thomas
(74) *Attorney, Agent, or Firm* — CROWE & DUNLEVY; Andre M. Szuwalski (57) ABSTRACT

An apparatus, system and method for securing wheeled shipping carts within a shipping container. The apparatus, system and method for securing wheeled shipping carts within a shipping container secures the shipping racks across the width of the container and vertically, and then end-to-end inside the length of the container from the fixed end of the container to the doors as the container is loaded. In addition, the system and method secures wheeled shipping carts within a shipping container using a securing apparatus installed within the shipping container to constrain the wheeled shipping carts both vertically and horizontally in location during transport.

23 Claims, 11 Drawing Sheets

(56) References Cited

U.S. PATENT DOCUMENTS

| | | | | |
|---|---|---|---|---|
| 5,727,353 | A | * | 3/1998 | Getz .................... A61B 6/4405 62/223 |
| 6,792,892 | B2 | * | 9/2004 | Craig ................... A01K 1/0236 119/502 |
| 9,016,490 | B1 | * | 4/2015 | Higgins ............... B65D 90/006 220/1.5 |
| 10,336,356 | B2 | | 7/2019 | Dyson |
| 2014/0027395 | A1 | | 1/2014 | Benoit et al. |
| 2014/0158653 | A1 | | 6/2014 | Evans |
| 2014/0175090 | A1 | | 6/2014 | Bellehumeur et al. |
| 2014/0231422 | A1 | | 8/2014 | Kochanowski |
| 2015/0225021 | A1 | | 8/2015 | Evans |
| 2016/0075510 | A1 | * | 3/2016 | Clive-Smith ........ B65D 90/046 206/520 |
| 2016/0083176 | A1 | * | 3/2016 | Kraft ................... B65D 88/522 220/1.5 |
| 2016/0090234 | A1 | | 3/2016 | Ronstadt |
| 2016/0101893 | A1 | | 4/2016 | Moore et al. |
| 2017/0178759 | A1 | | 6/2017 | Forsythe et al. |
| 2017/0247180 | A1 | | 8/2017 | DiSorbo |
| 2017/0369087 | A1 | | 12/2017 | Dyson |
| 2018/0002120 | A1 | | 1/2018 | Allegretti et al. |

* cited by examiner

APPARATUS, SYSTEM AND METHOD FOR SECURING WHEELED SHIPPING CARTS WITHIN A SHIPPING CONTAINER

CROSS REFERENCE TO RELATED APPLICATIONS

This application is a divisional of U.S. patent application Ser. No. 16/831,097, filed Mar. 26, 2020, which claims the benefit of U.S. Provisional Patent Application No. 62/823,805 titled "Conex Container Retrofit—Wheeled Shipping Racks", filed Mar. 26, 2019, the contents of which are incorporated herein by reference in their entireties into this document as if fully set out at this point.

BACKGROUND OF THE INVENTION

1 Field of the Invention

This invention relates generally to an apparatus, system and method for securing wheeled shipping carts within a shipping container, and more particularly to a system and method for securing wheeled shipping carts within a shipping container wherein the wheeled shipping carts work in conjunction with a securing apparatus installed within the shipping container constrain the wheeled shipping carts both vertically and horizontally in location during transport.

2. Description of the Related Art

Conex or intermodal shipping containers are frequently used for transporting products in bulk format from overseas locations on a boat to the United States, but they can also be used for shipping bulk components within the United States from point-to-point using a Landoll-type flatbed trailer as a means of transport.

The items that might ship within the shipping containers could be in many different types of packaging formats, such as boxes, crates, pallets, gaylords, and potentially others. To make the best use of the container space, these items are generally stacked floor-to-ceiling and wall-to-wall. Depending on the length of the trip and condition of the roads being traveled on, the product(s) inside the shipping container could see some fairly violent vibrations or bumps. For that reason, the load is generally secured to either the side walls, floor or both using straps, load bars, netting or other commercially available means.

Wheeled shipping or transfer carts with stackable trays are frequently employed to protect the integrity of valuable products and components during transport from the manufacturer to the end user or customer. Traditionally, the wheeled shipping carts and stackable trays are made from welded structural steel or aluminum framing to provide strong support for heavy products. The trays can be stacked and secured together to the wheeled shipping cart in order to ship and protect the maximum amount of product in the minimum amount of floor space. These wheeled shipping carts are designed to be recyclable from point of origin, to point of use over a substantially long time period, so securing the product load must be consistent, re-usable, and must protect the product from being damaged due to travel conditions.

For transport, the wheeled shipping carts are placed into and secured to the walls and/or the floor of the Conex or intermodal shipping container using tie downs. Once the shipping container has been received, the wheeled shipping carts are removed from the container and the products are either removed from the transfer racks and placed into the end user's storage system, or these same transfer racks can potentially be used by the end user for storage and/or deployment in their facility. Empty shipping carts are recycled back to the supplier for future product shipments.

Conventional means of securing the wheeled shipping carts with stackable trays do not adequately secure the shipping carts within the shipping container due to restricted space between and around all sides of the cart once loaded into the shipping container in a two-by-two or side-by-side fashion.

It is therefore desirable to provide an improved apparatus, system and method for securing wheeled shipping carts within a shipping container.

It is further desirable to provide an apparatus, system and method for securing wheeled shipping carts within a shipping container in a format that substantially fills the interior space of the container.

It is still further desirable to provide an apparatus, system and method for securing wheeled shipping carts within a shipping container that secures the shipping racks across the width of the container and vertically, and then end-to-end inside the length of the container from the fixed end of the container to the doors as the container is loaded.

It is still further desirable to provide a system and method for securing wheeled shipping carts within a shipping container wherein the wheeled shipping carts work in conjunction with a securing apparatus installed within the shipping container to lock the wheeled shipping carts in place keeping the shipping carts constrained both vertically and horizontally in location for transport.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

The apparatus, system and method of securing wheeling shipping carts within a shipping container disclosed herein is designed to transport re-usable, wheeled and stacked shipping carts securing them for transport, especially for over-road conditions while being transported on Landoll-type trailers. The system and method utilize a securing apparatus that includes a pair of longitudinal support members attached to the side walls inside the container at a predetermined height from the floor, and that has a plurality of notches that are configured to respectively receive a lateral crossmember, which is removably secured in the notches. The longitudinal support members not only provide notches for installation of the lateral crossmembers, but also provide for lead-in guidance for the shipping carts keeping them from directly contacting the side walls of the containers. The lateral crossmembers have projecting tabs that are configured to engage the mounting flanges with minimal clearance, with lead-in to help position the shipping carts horizontally and with minimal clearance between the edge of the tab, and the gusset to provide constraint across the width of the container.

The lateral crossmembers are secured not only to the longitudinal support members along the length of the container but also are secured to the floor near the middle of the container along a caster guide assembly that is secured to the floor of the container. The lateral crossmembers when installed on both the leading and trailing ends of the shipping cart secure all four corners both vertically and horizontally near the casters of the shipping carts. The lateral crossmember assemblies are configured to work universally in either of two horizontal orientations, to minimize the chance of improper installation.

The caster guide assemblies are secured to the floor of the container and form channels that act as guides for the casters during movement, both in to and out of the container. The caster guide assemblies also provide support to secure the lateral crossmember assemblies near the center of the shipping container.

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE DRAWINGS

While this invention is susceptible of embodiment in many different forms, there is shown in the drawings, and will herein be described hereinafter in detail, some specific embodiments of the invention. It should be understood, however, that the present disclosure is to be considered an exemplification of the principles of the invention and is not intended to limit the invention to the specific embodiments so described.

The invention relates to an apparatus, system and method for securing wheeled shipping carts within a shipping container. Referring to the figures of the drawings, wherein like numerals of reference designate like elements throughout the several views, and initially to FIGS. 1 through 4, the system and method secure a plurality of wheeled shipping carts 100 within an interior space 12 of an intermodal shipping container 10 (also referred to as a Conex container) using a securing apparatus 200. The interior space 12 of the shipping container 10 is defined by a floor 14, a pair of opposing side walls 16, a ceiling (not shown), a walled closed end 18, and an opposing open end 20 having a pair of doors 22 hingedly attached thereto.

Figure 1:
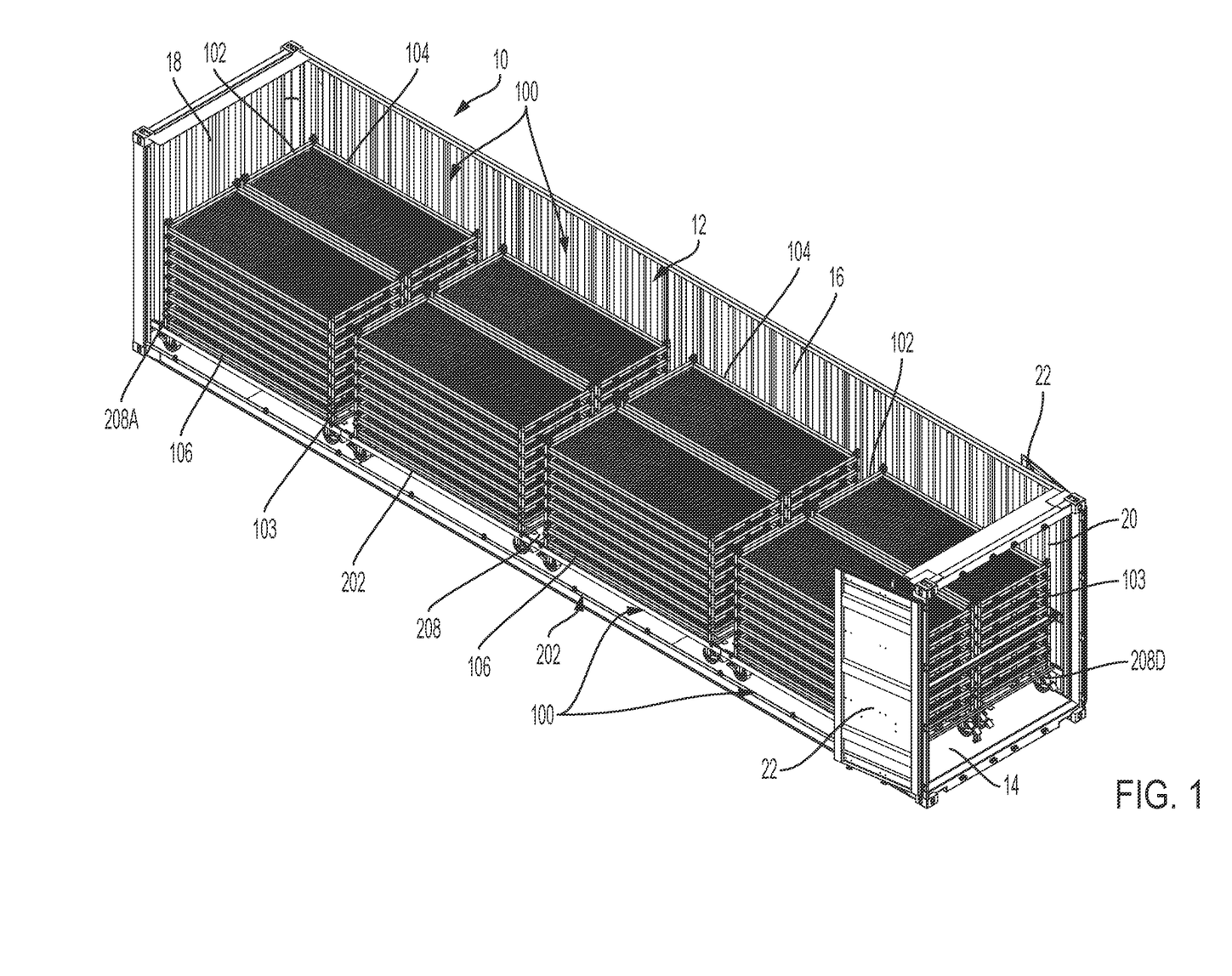
FIG. 1 is a partial cutaway perspective view of an intermodal or Conex shipping container having a plurality of wheeled shipping carts secured therein in accordance with an illustrative embodiment of the invention disclosed herein.
Figure 2:
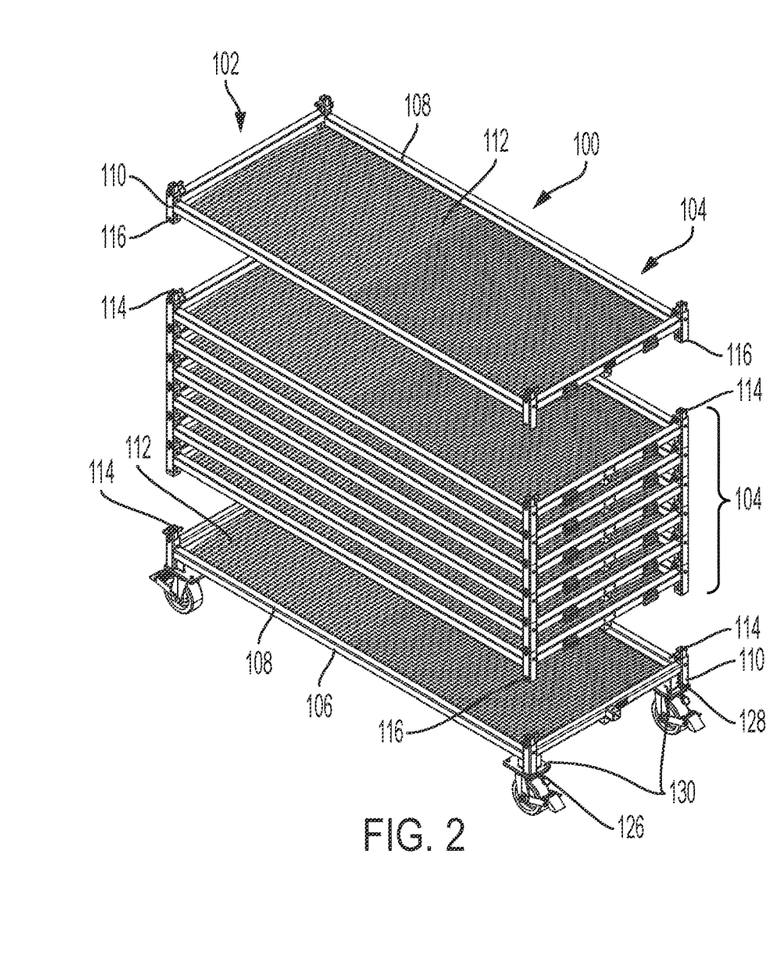
FIG. 2 is an exploded perspective view of an example of a wheeled shipping cart having a plurality of stackable trays in accordance with an illustrative embodiment of the invention disclosed herein.
Figure 3:
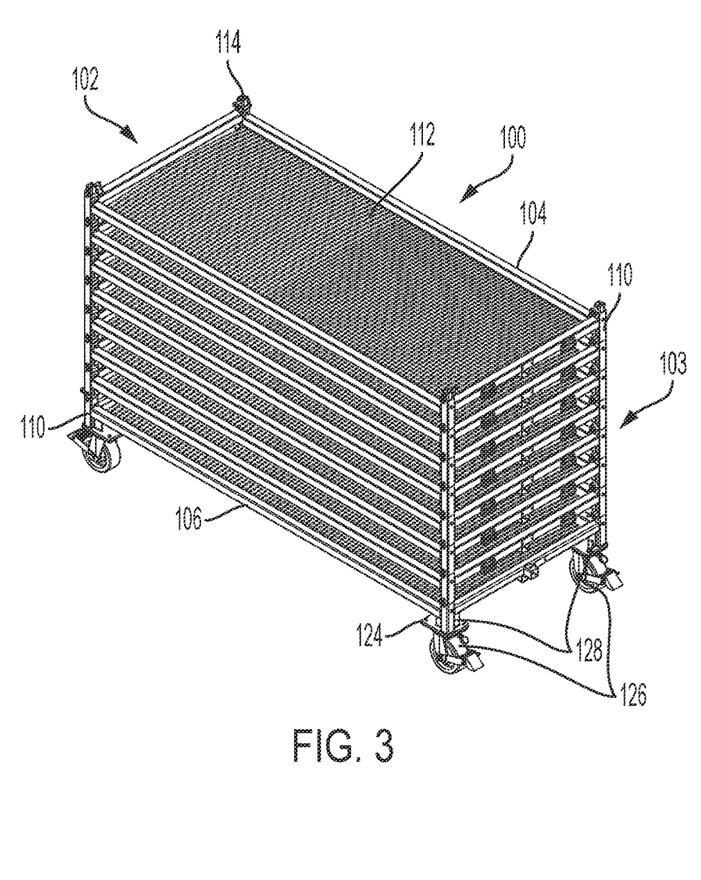
FIG. 3 is a perspective view of the wheeled shipping cart of FIG. 2 with the stackable trays stacked and secured together a perspective view of the stackable trays 104 stacked and secured together in accordance with an illustrative embodiment of the invention disclosed herein.

Each of the wheeled shipping carts 100 has a leading end 102 and a trailing end 103 with a plurality of stackable trays 104 containing one more parts or products (not shown). Each of the stackable trays 104 may contain one part or product or multiple parts or products, and the shipping carts 100 fully support large products or parts with flat or curved surfaces. In addition, the stackable trays 104 can be stacked and secured together in order to ship and protect the maximum amount of product in the minimum amount of floor space 14. FIG. 2 is an exploded perspective view of the stackable trays 104 of the shipping container 10 separated and detached, and FIG. 3 is a perspective view of the stackable trays 104 stacked and secured together.

Each of the wheeled shipping carts 100 includes a lower base tray 106 configured to engage with one of the stackable trays 104, and the lower base tray 106 supports the plurality of trays 104 in a stacked arrangement. Each stackable tray 104 and the base tray 106 of the shipping cart 100 is formed by perimeter steel or aluminum frame members 108 that are welded or otherwise attached to steel or aluminum vertical corner frame members 110 to form a rectangular perimeter frame. Each stackable tray 104 and the base tray 106 of the shipping cart 100 also includes a flat or arced support surface 112 that conforms to a surface of the product or part. The support surface 112 can be constructed of sheet metal, perforated metal or expanded metal.

A male member 114 on each of the corner frame members 110 of the stackable trays 104 and the base tray 106 (positioned and facing upwards) is configured to engage a corresponding female member 116 of the corner frame members 110 of the stackable trays 104 as shown in FIG. 2. A pin 118 with a spring clip 120 is then inserted through an aperture 122 in both the female member 116 and the male member 114, thereby securing the vertical corner frame members 110 of the base tray 106 and stackable trays 104 together.

Figure 4:
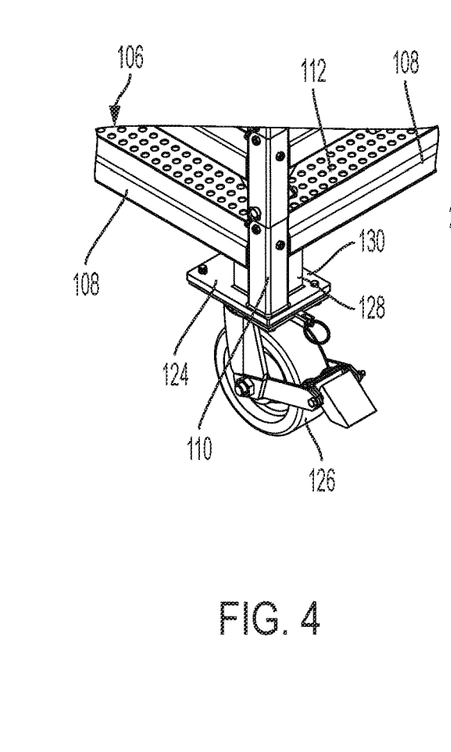
FIG. 4 is a perspective view of an example of a lower base tray and casters in accordance with an illustrative embodiment of the invention disclosed herein.
Figure 5:
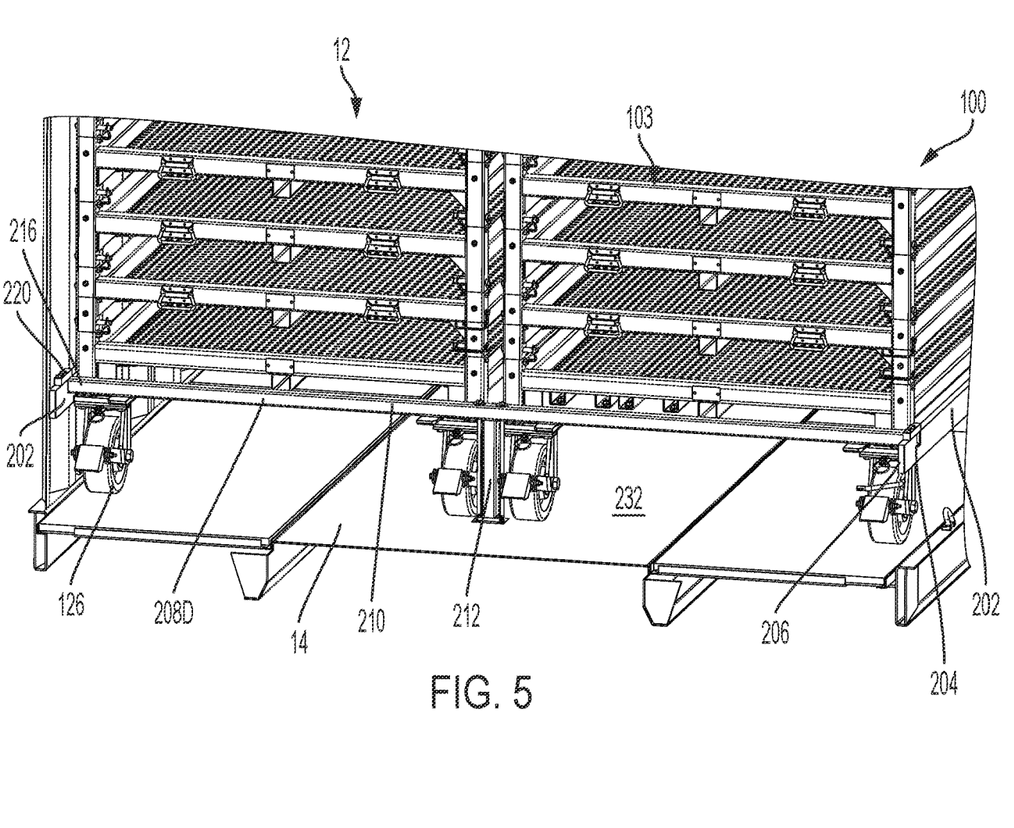
FIG. 5 is a perspective view of an example of an open end of a shipping container with a set of shipping carts secured therein in accordance with an illustrative embodiment of the invention disclosed herein.
Figure 6:
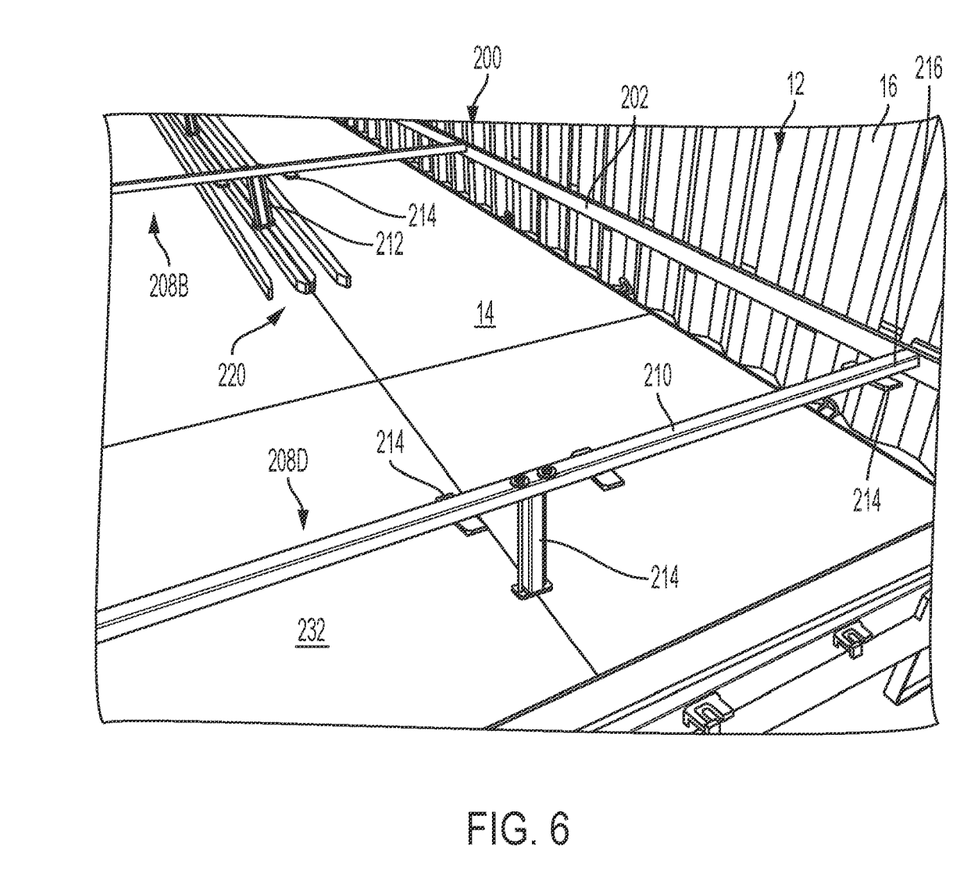
FIG. 6 is a perspective view of an interior space of a shipping container having an example of a securing apparatus installed therein in accordance with an illustrative embodiment of the invention disclosed herein.
Figure 7:
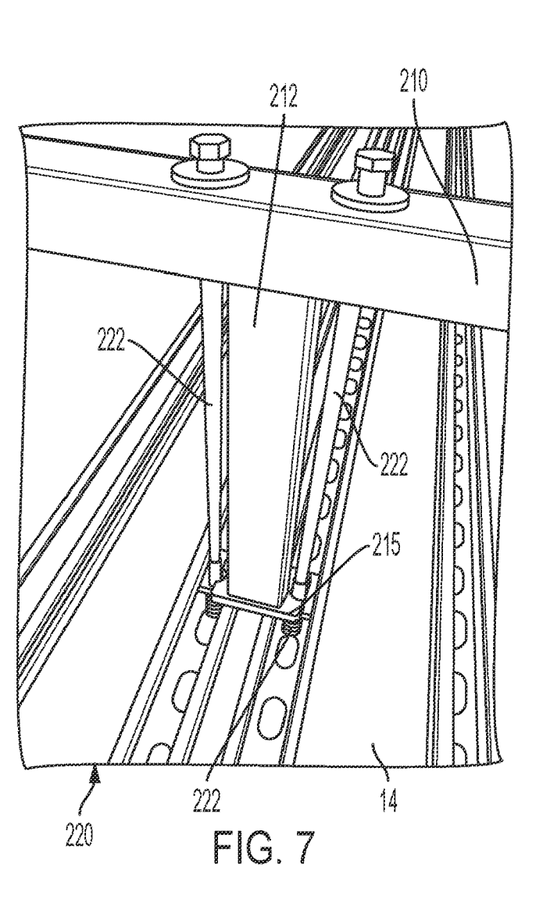
FIG. 7 is a perspective view of an example of a lateral crossmember assembly in accordance with an illustrative embodiment of the invention disclosed herein.

As can be clearly seen in FIG. 4, the base tray 106 includes mounting flanges 124 to which a plurality of casters 126 are respectively attached. Each of the mounting flanges 124 is respectively welded or otherwise attached to the vertical corner frame members 110 and to the perimeter frame members 108 via gussets 128. The gussets 128 are configured not to extend to the edge of the mounting flange 124, thereby leaving an engagement area 130 that is used to secure the shipping carts 100 vertically and horizontally. The casters 126 are lockable to prevent the cart 100 from unintentional rolling; the casters 126, when unlocked, allow the shipping cart 100 and the products loaded onto the shipping cart 100 to be easily moved or transported, particularly over flat and smooth surfaces.

Turning now to FIGS. 5 through 10, a securing apparatus 200 is installed in the interior space 12 of the shipping container 10. The securing apparatus 200 includes a pair of longitudinal support members 202 welded, fastened or otherwise attached to the opposing side walls 16 at a predetermined height from the floor 14 of the container 10. Each of the longitudinal support members 202 can be constructed as a unitary member or constructed in multiple segments, and includes a plurality of spaced notches 204 along the length thereof. The longitudinal support members 202 extend along the length of the shipping container 10 and provide guidance for the shipping carts 100 by keeping them from contacting the side walls 16 of the shipping container 10. Each of the longitudinal support members 202 has a beveled terminal edge 206 near the open end 20 of the container 10 for loading guidance.

The securing apparatus 200 also includes a plurality of lateral crossmember assemblies 208 each having a lateral crossmember 210 and an upright crosstie 212. Each of the lateral crossmembers 210 has a plurality of spaced tabs or feet 214 symmetrically projecting from both sides of the lateral crossmember 210, which allows the lateral crossmember assembly 208 to be installed in either orientation reducing the risk of it being installed incorrectly either at the point of origin or the point of use for return. The symmetrically projecting tabs 214 can also be used to secure the trailing end 103 of a first set of shipping carts 100 and the leading end 102 of a second set of shipping carts 100 loaded into the shipping container 10.

The lateral crossmembers 210 have opposing terminal ends 216 that are respectively received within the notches 204 of the longitudinal support member 202. The lateral crossmember 210 are secured within the notches 204 with a clamp member 218 that is removably attached using fasteners 220 or the like. Each terminal end of the lateral crossmembers 210 can also include an additional lower support member 215 that limits the lateral motion of the lateral crossmembers 210 to ensure that the lateral crossmembers 210 do not disengage from the longitudinal support members 202 attached to the side walls 16 of the shipping container 10, especially in locations where the outer sheet metal skin of the side walls 16 of the container 10 may bend outward. The lower support members 215 are welded, fastened or otherwise attached to a lower surface of the lateral crossmembers 210.

Except for the lateral crossmember assembly 208 adjacent the open end 20 of the shipping container 10, each of the upright crossties 212 engages with and is supported by a center caster guide assembly 220. The lateral crossmember assemblies 208 may be secured to the center caster guide assembly 220 using fasteners 222, which may be configured as two lag bolts threadedly engaging two spring loaded nuts. Alternatively, one or more of the upright crossties 212 could be directly attached to the floor 14 of the shipping container 10 similar to the lateral crossmember assembly 208 adjacent the open end 20 of the shipping container 10.

Figure 8:
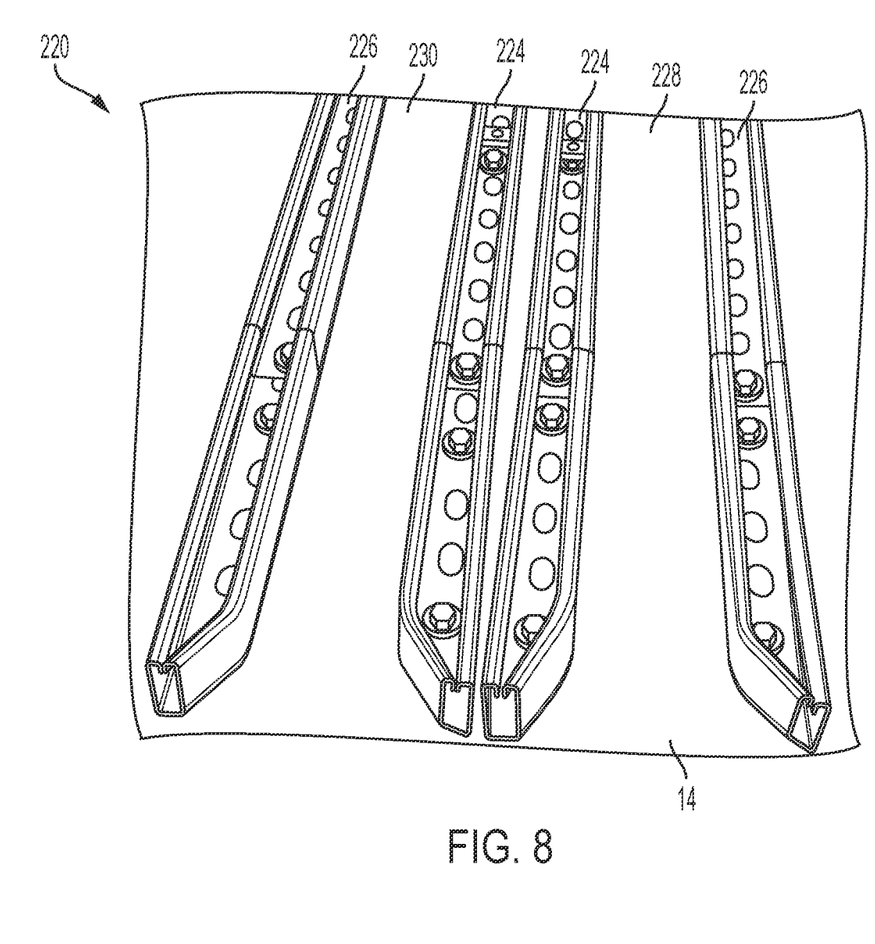
FIG. 8 is a perspective view of an example of a caster guide assembly in accordance with an illustrative embodiment of the invention disclosed herein.
Figure 9:
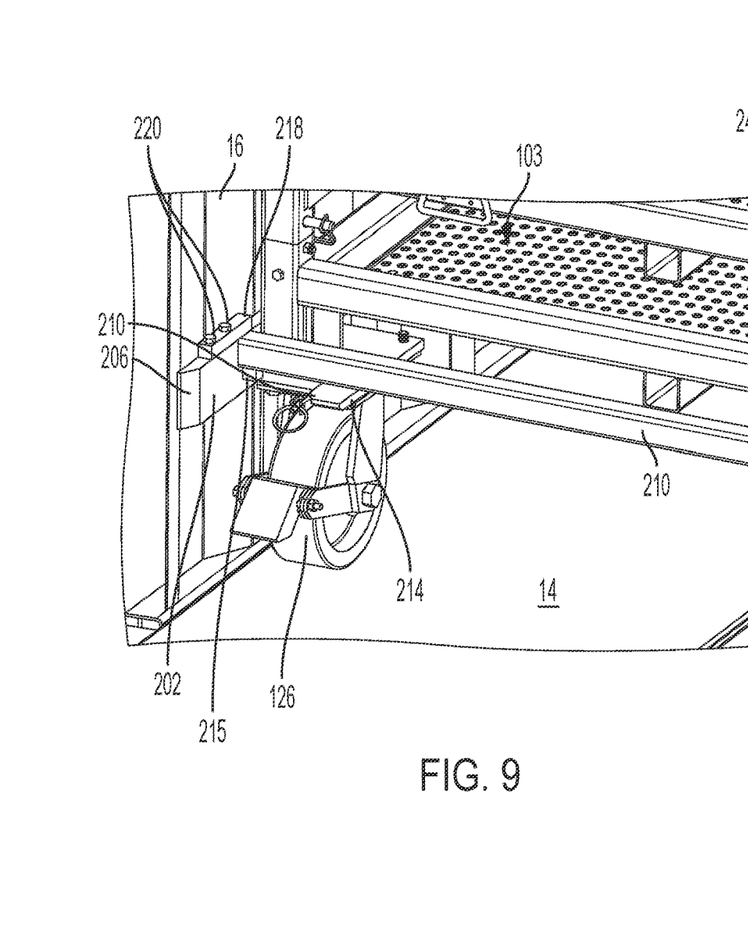
FIG. 9 is a perspective view of an example of a trailing end of a shipping cart secured within an interior space of a shipping container in accordance with an illustrative embodiment of the invention disclosed herein.
Figure 10:
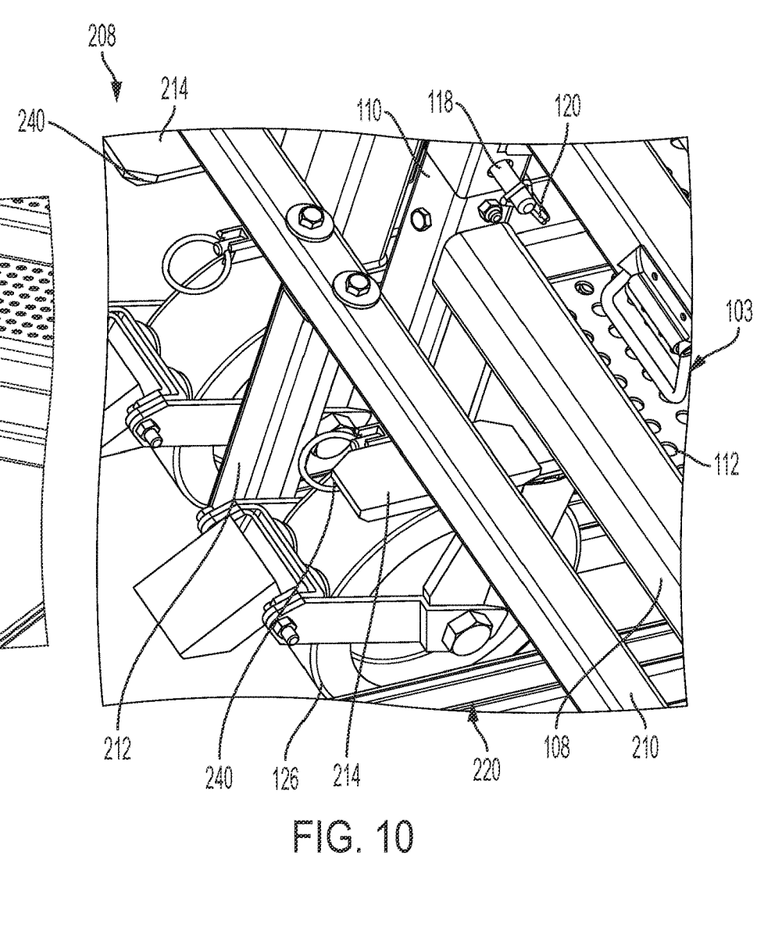
FIG. 10 is a perspective view of a shipping container secured to a lateral crossmember assembly in accordance with an illustrative embodiment of the invention disclosed herein.
Figure 11:
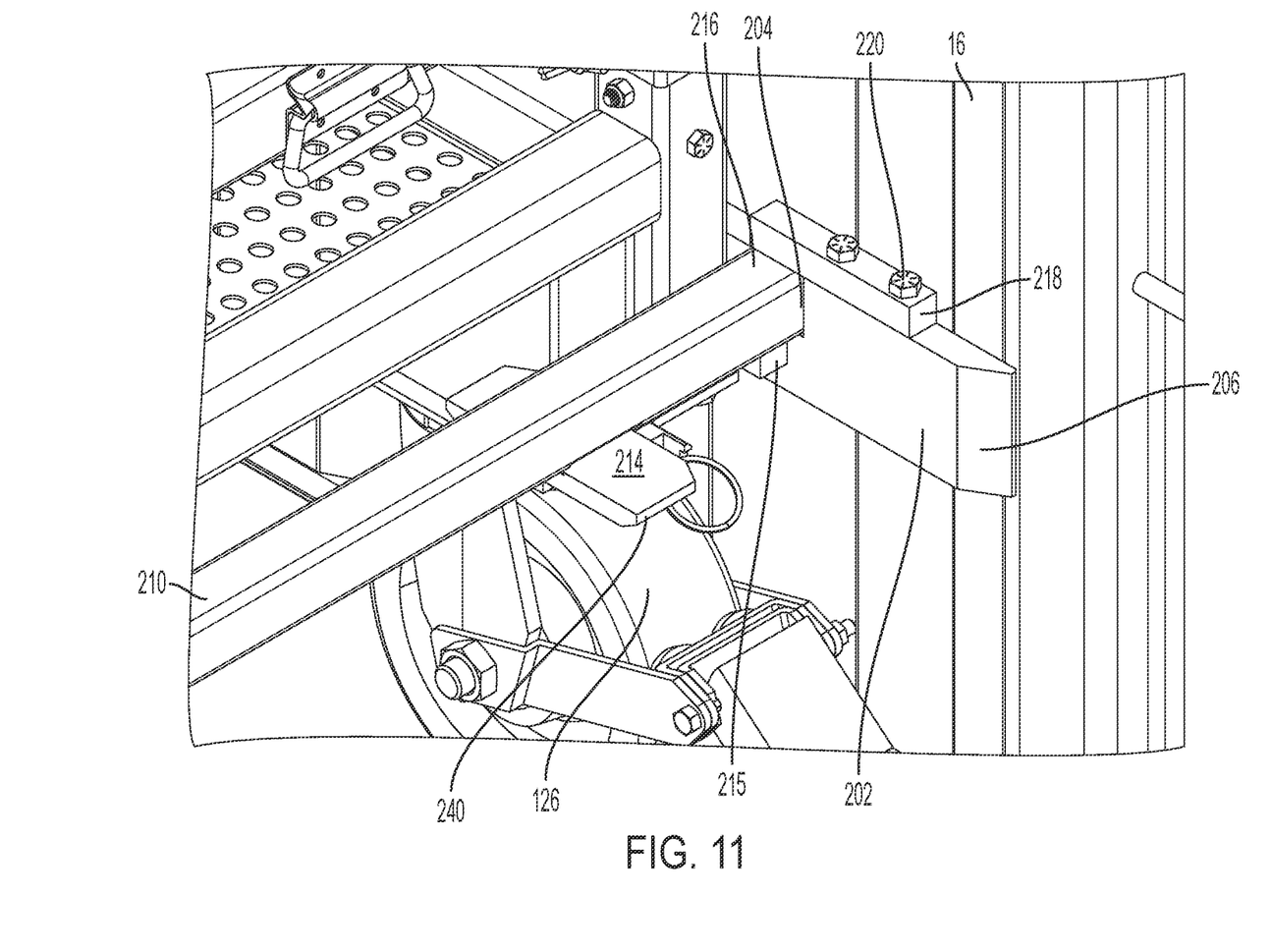
FIG. 11 is another perspective view of an example of a trailing end of a shipping cart secured within an interior space of a shipping container in accordance with an illustrative embodiment of the invention disclosed herein.

The center caster guide assembly 220 is attached to the floor 14 of the container 10, and as exemplified in the drawings, the center caster guide assembly 220 can be constructed using a pair of inner caster guide members 224 and a pair of outer caster guide members 226 forming a first caster guide channel 228 and a second caster guide channel 230 that serve as caster wheel guides for the shipping carts 100. As noted above, the inner caster guide members 224 also support and are fastened to the upright crossties 212. As illustrated in the figures, the inner caster guide members 224 and/or the outer caster guide members 226 can be Unistrut rails in construction. As also illustrated in the figures, the center caster guide assembly 220 may not extend the entire length of the floor 14 of the container 10, but rather the center caster guide assembly 220 may be shortened to a length less than the entire length in order to provide for a lead-in area 232 to aid in loading and unloading the wheeled shipping carts 100. The casters 126 on the leading end 102 of the last set of shipping carts 100 engage and are guided into place by the center caster guide assembly 220 while the casters 126 on the trailing end 104 nearest the open end 20 of the container 10 remain unguided in the lead-in area 232.

Before shipping carts 100 are loaded into the shipping container 10, a leading lateral crossmember assembly 208A is installed adjacent to the walled closed end 18 of the container 10. The terminal ends of the lateral crossmember 210 of the leading lateral crossmember assembly 208A is fastened within the notches 204 of the longitudinal support member 202 closest to the walled closed end 18 of the container 10. The upright crosstie 212 of the leading lateral crossmember assembly 208A is fastened to the inner guide members 224 of the caster guide assembly 220.

Once the leading lateral crossmember assembly 208A is installed, the first set of shipping carts 100 can be loaded into the container 10, such as first one side then the other, until the shipping carts 100 reach the leading lateral crossmember assembly 208A. The tabs 214 of the lateral crossmember 204 slide over the top of the mounting flanges 124 and engage the engagement area 130 with minimal clearance. Beveled edges 240 on each of the projecting tabs 214 helps to channel the shipping cart 100 horizontally into position with minimal clearance between the edge 240 of the tab 214 and the gusset 128 attached to the base tray 106 of the shipping cart 100.

Figure 12:
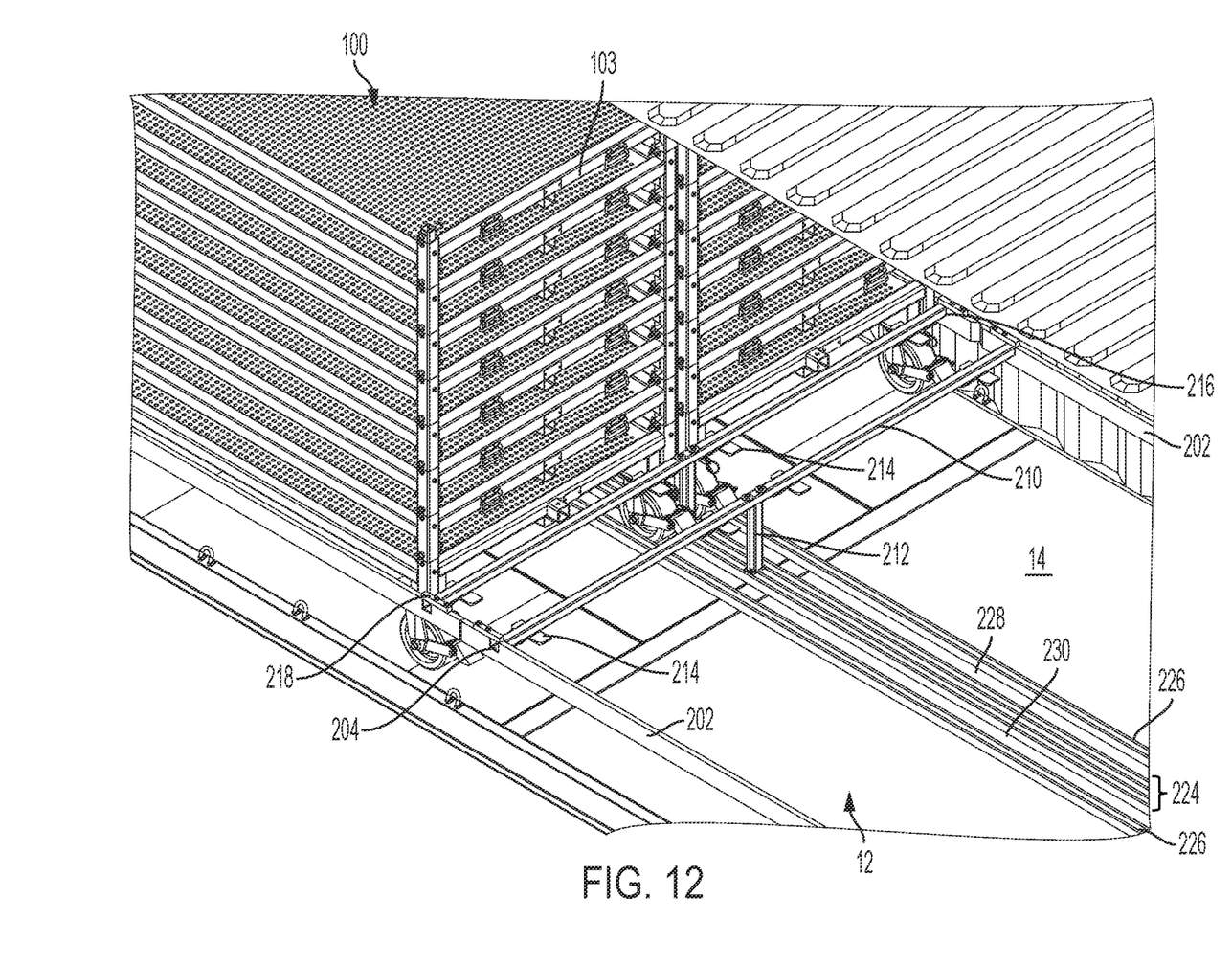
FIG. 12 is a perspective view of an example of two intermediate lateral crossmembers installed within an interior space of a shipping container in accordance with an illustrative embodiment of the invention disclosed herein.

With the first set of shipping carts 100 loaded into the container 10 and confined on the leading ends 102 by the leading lateral cross-member assembly 208A, a first intermediate lateral crossmember assembly 208B is installed in a similar manner on the trailing ends 103 of the first set of shipping carts 100. A second intermediate lateral crossmember assembly 208C can be installed in a spaced relation and near proximity to the first intermediate lateral crossmember assembly 208B. Alternatively, if space is not needed or desired between adjacent sets of shipping carts 100, a single intermediate lateral cross-member assembly can be used between the adjacent sets of shipping carts 100 that confines the trailing end 103 of the first set of carts 100 and the leading end 102 of the second set of shipping carts 100. The system and method of loading the next set of shipping carts 100 can be substantially repeated until the container 10 is fully loaded.

At the open end 20 of the container 10, a trailing lateral cross-member assembly 208D is removably secured directly to the floor 14 of the container 10. As exemplified in FIGS. 11-15, the upright crosstie 212 of the trailing lateral cross-member assembly 208D is attached to the floor 14 using fasteners 234 that pass through the floor 14 and engage a nut bar 236 positioned under the floor 14 of the shipping container 10. The fasteners 234 secure to the nut bar 236 on the underside of the floor 14. When the trailing lateral crossmember assembly 208D is removed, there is nothing in the lead-in area 232 to impede the movement of the shipping carts 100 into or out of the shipping container 10.

The leading lateral crossmember assembly 208A, the intermediate lateral crossmember assemblies 208B/C, and the trailing lateral crossmember assembly 208D can also be color-coded in order to further reduce the risk of them being installed incorrectly.

Figures 13, 14:
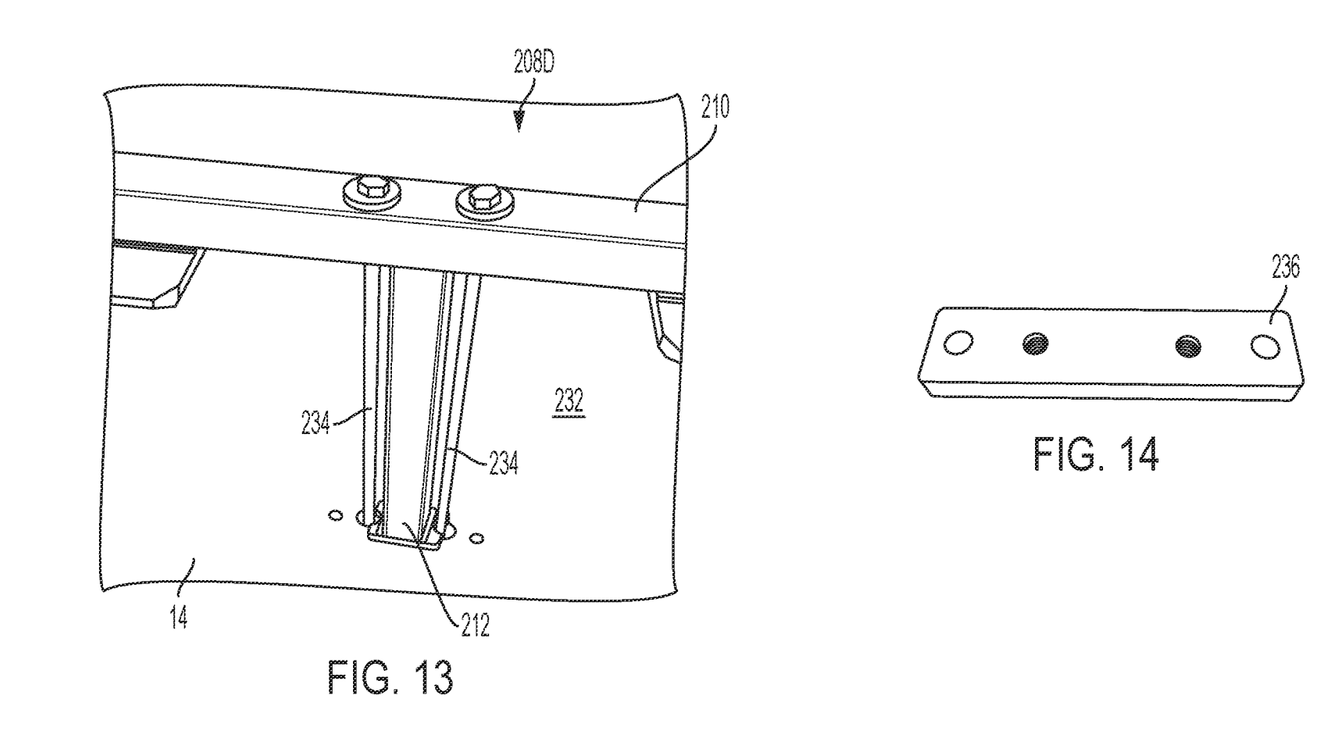
FIG. 13 is a perspective view of an example of a trailing lateral crossmember assembly attached to lead-in area of a shipping container in accordance with an illustrative embodiment of the invention disclosed herein.
FIG. 14 is a perspective view of an example of a nut bar in accordance with an illustrative embodiment of the invention disclosed herein.
Figure 15:
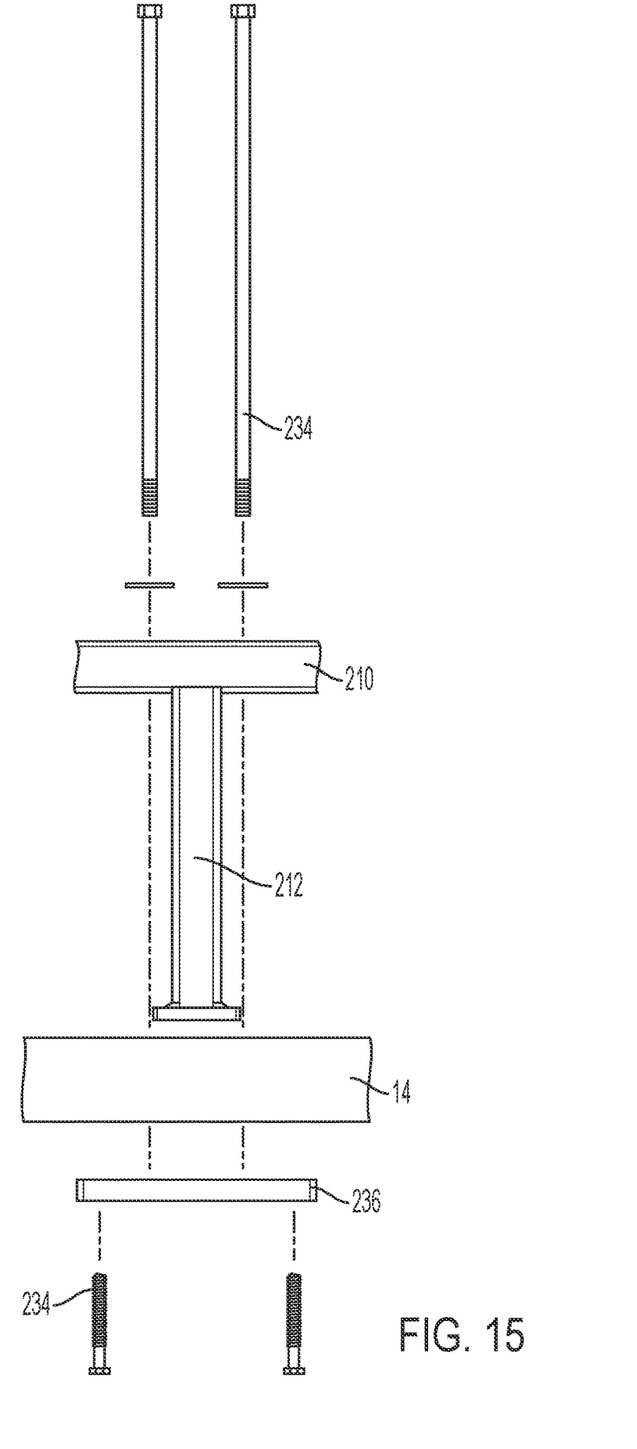
FIG. 15 is an exploded view of an example of a trailing lateral crossmember assembly attached to a floor of a shipping container using the nut bar shown in FIG. 14 in accordance with an illustrative embodiment of the invention disclosed herein.
Figure 16:
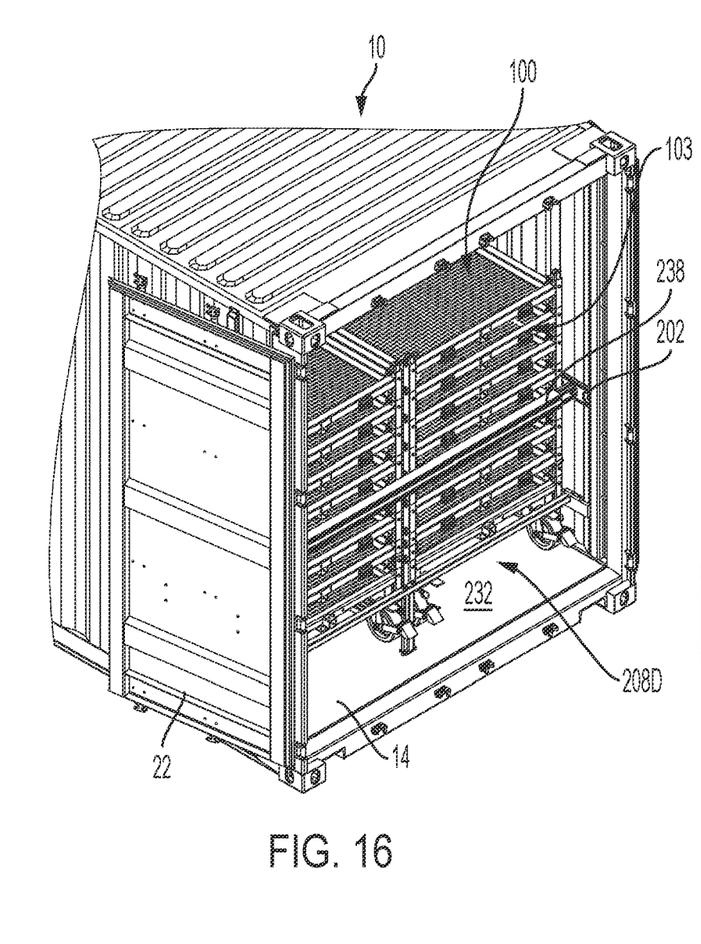
FIG. 16 is a perspective view of an example of an open end of a shipping container having a plurality of shipping carts safely confined therein using a load retaining bar attached to longitudinal support members in accordance with an illustrative embodiment of the invention disclosed herein.
Figure 17:
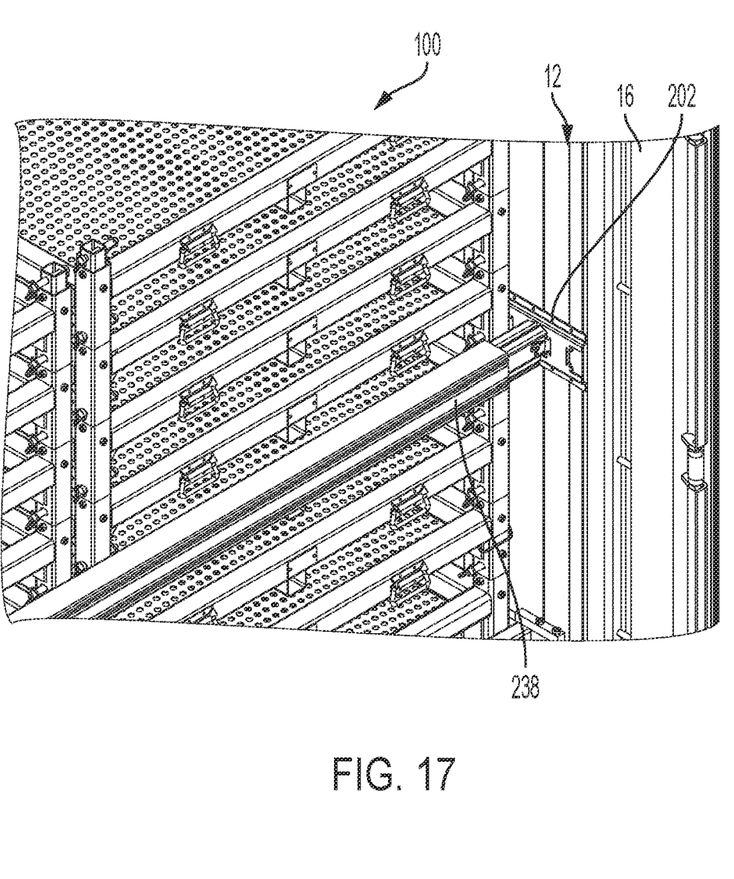
FIG. 17 is another perspective view of the load retaining bar shown in FIG. 16.

As illustrated in FIGS. 14-15, in addition to the trailing lateral cross-member assembly 208D, at the open end 20 of the container 10 for added safety, a load retaining bar 238 or appropriate straps or other fasteners can be used to engage a short section of the longitudinal support members 202 attached to the side walls 16 near the open end 20 of the container 10.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

For purposes of the instant disclosure, terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

Thus, the invention is well adapted to carry out and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of securing a plurality of wheeled shipping carts in a shipping container having a walled closed end, a door end, side walls and a floor, comprising the steps of:
    a) installing a leading lateral crossmember assembly adjacent to the walled closed end of the shipping container and laterally extending between the side walls of the shipping container;
    b) loading a first set of wheeled shipping carts into the shipping container and securing a leading end of the first set of wheeled shipping carts with the leading lateral crossmember assembly; and
    c) installing an intermediate lateral crossmember assembly adjacent to a trailing end of the first set of wheeled shipping carts and laterally extending between the side walls of the shipping container, and securing the trailing end of the first set of wheeled shipping carts with the first intermediate lateral crossmember assembly.

2. The method of claim 1, further comprising:
    d) loading an additional set of the wheeled shipping carts into the shipping container and securing a leading end of the additional set of wheeled shipping carts with the intermediate lateral crossmember assembly; and
    e) installing a further intermediate lateral crossmember assembly adjacent to a trailing end of the additional set of wheeled shipping carts and laterally extending between the side walls of the shipping container, and securing the trailing end of the additional set of wheeled shipping carts with the further intermediate lateral crossmember assembly.

3. The method of claim 2, further comprising:
    repeating steps d) and e) until the loading of the shipping container is completed.

4. The method of claim 3, further comprising, prior to step a), the steps of:

installing a longitudinal support member on each side wall of the shipping container; and installing a caster guide assembly along a length of the floor of the shipping container.

5. The method of claim 4, wherein installing said further intermediate lateral crossmember for a last set of wheeled shipping carts comprises:

securing terminal ends of a lateral crossmember of said further lateral crossmember assembly within spaced notches of the longitudinal support members; and securing an upright crosstie of the further lateral crossmember assembly to the floor of the shipping container.

6. The method of claim 5, further comprising installing a load retaining bar adjacent to the trailing ends of the last set of wheeled shipping carts.

7. A method of securing a plurality of wheeled shipping carts in a shipping container method, comprising, the steps of:

a) installing a longitudinal support member on each side wall of the shipping container;

b) installing a caster guide assembly along a length of a floor of the shipping container;

c) installing a leading lateral crossmember assembly adjacent to a walled closed end of the shipping container;

d) loading a first set of wheeled shipping carts into the shipping container and securing a leading end of the first set of wheeled shipping carts with the leading lateral crossmember assembly; and e) installing an intermediate lateral crossmember assembly adjacent to a trailing end of the first set of wheeled shipping carts and securing the trailing end of the first set of wheeled shipping carts with the first intermediate lateral crossmember assembly.

8. The method of claim 7, wherein installation of each lateral crossmember assembly comprises the steps of:

securing terminal ends of a lateral crossmember for each lateral crossmember assembly within spaced notches of the longitudinal support members; and securing upright crossties of each lateral crossmember assembly to the caster guide assembly.

9. The method of claim 7, further comprising installing a load retaining bar adjacent to the trailing ends of a last set of wheeled shipping carts.

10. The method of claim 7, further comprising:

f) loading an additional set of the wheeled shipping carts into the shipping container and securing a leading end of the additional set of wheeled shipping carts with the intermediate lateral crossmember assembly; and g) installing a further intermediate lateral crossmember assembly adjacent to a trailing end of the additional set of wheeled shipping carts and securing the trailing end of the additional set of wheeled shipping carts with the further intermediate lateral crossmember assembly.

11. The method of claim 10, further comprising:

repeating steps f) and g) until the loading of the shipping container is completed.

12. The method of claim 10, wherein installing said further intermediate lateral crossmember for a last set of wheeled shipping carts comprises:

securing terminal ends of a lateral crossmember of said further lateral crossmember assembly within spaced notches of the longitudinal support members; and securing an upright crosstie of the further lateral crossmember assembly to a floor of the shipping container.

13. The method of claim 12, further comprising installing a load retaining bar adjacent to the trailing ends of the last set of wheeled shipping carts.

14. A method of securing a plurality of wheeled shipping carts in a shipping container having a walled closed end, a door end, side walls and a floor, comprising the steps of:

a) mounting opposite ends of a leading lateral crossmember assembly to the side walls of the shipping container adjacent to the walled closed end of the shipping container;

b) loading a first set of the wheeled shipping carts into the shipping container, and securing a leading end of the first set of wheeled shipping carts with the leading lateral crossmember assembly;

c) mounting opposite ends of a first intermediate lateral crossmember assembly to the side walls of the shipping container adjacent to a trailing end of the first set of wheeled shipping carts, and securing the trailing end of the first set of wheeled shipping carts with the first intermediate lateral crossmember assembly;

d) mounting opposite ends of additional intermediate lateral crossmember assemblies to the side walls of the shipping container for additional sets of wheeled shipping carts until the shipping container is fully loaded; and e) mounting opposite ends of a trailing lateral crossmember assembly to the side walls of the shipping adjacent to a trailing end of a last set of wheeled shipping carts, and securing the trailing end of the last set of wheeled shipping carts with the trailing lateral crossmember assembly.

15. A method of securing a plurality of wheeled shipping carts in a shipping container, comprising the steps of:

a) installing a longitudinal support member on each side wall of the shipping container;

b) installing a caster guide assembly along a length of a floor of the shipping container;

c) installing a leading lateral crossmember assembly adjacent to a walled closed end of the shipping container;

d) loading a first set of the wheeled shipping carts into the shipping container, and securing a leading end of the first set of wheeled shipping carts with the leading lateral crossmember assembly;

e) installing a first intermediate lateral crossmember assembly adjacent to a trailing end of the first set of wheeled shipping carts, and securing the trailing end of the first set of wheeled shipping carts with the first intermediate lateral crossmember assembly;

f) installing additional intermediate lateral crossmember assemblies in the shipping container for additional sets of wheeled shipping carts until the shipping container is fully loaded; and g) installing a trailing lateral crossmember assembly adjacent to a trailing end of a last set of wheeled shipping carts, and securing the trailing end of the last set of wheeled shipping carts with the trailing lateral crossmember assembly.

16. The method of claim 15, wherein steps c) and e) each further comprise:

securing terminal ends of a lateral crossmember for each of the leading lateral crossmember assembly and the first intermediate lateral crossmember assembly within spaced notches of the longitudinal support members; and securing upright crossties for each of the leading lateral crossmember assembly and the first intermediate lateral crossmember assembly to the caster guide assembly.

17. The method of claim 15, wherein step g) further comprises:
securing terminal ends of a lateral crossmember of the trailing lateral crossmember assembly within spaced notches of the longitudinal support members; and
securing an upright crosstie of the trailing lateral crossmember assembly to the floor of the shipping container.

18. The method of claim 15, further comprising installing a load retaining bar adjacent to the trailing end of the last set of wheeled shipping carts.

19. The method of claim 14, wherein the floor of the shipping contained comprises a caster guide assembly along a length of the floor, and further comprising: securing upright crossties for each of the leading lateral crossmember assembly and the first intermediate lateral crossmember assembly to the caster guide assembly.

20. A method of securing a plurality of wheeled shipping carts in a shipping container having a walled closed end, a door end, side walls with a longitudinal support member on each side wall and a floor, comprising the steps of:
a) installing opposed ends of a first lateral crossmember assembly to the longitudinal support members on the side walls of the shipping container;
b) loading a first set of wheeled shipping carts into the shipping container and securing a leading end of the first set of wheeled shipping carts with the leading lateral crossmember assembly; and
c) installing opposed ends of a second lateral crossmember assembly to the longitudinal support members on the side walls of the shipping container adjacent to a trailing end of the first set of wheeled shipping carts and securing the trailing end of the first set of wheeled shipping carts with the second lateral crossmember assembly.

21. The method of claim 20, further comprising:
d) loading a second set of the wheeled shipping carts into the shipping container and securing a leading end of the second set of wheeled shipping carts with the second lateral crossmember assembly; and
e) installing opposed ends of a third lateral crossmember assembly to the longitudinal support members on the side walls of the shipping container adjacent to a trailing end of the second set of wheeled shipping carts and securing the trailing end of the second set of wheeled shipping carts with the third lateral crossmember assembly.

22. The method of claim 21, further comprising:
repeating steps d) and e) until the loading of the shipping container is completed.

23. The method of claim 20, wherein installing opposed ends comprises securing the opposed ends within spaced notches of the longitudinal support member.

\* \* \* \* \*

UNITED STATES PATENT AND TRADEMARK OFFICE
CERTIFICATE OF CORRECTION

| | | |
|---|---|---|
| PATENT NO. | : 11,760,564 B2 | Page 1 of 1 |
| APPLICATION NO. | : 18/085758 | |
| DATED | : September 19, 2023 | |
| INVENTOR(S) | : Brian Charles Evans et al. | |

It is certified that error appears in the above-identified patent and that said Letters Patent is hereby corrected as shown below:

In the Claims

At Column 8, Claim No. 1, Line 50, please delete the word "first"

Signed and Sealed this
Twenty-fourth Day of October, 2023

Katherine Kelly Vidal
*Director of the United States Patent and Trademark Office*